United States Patent
Huang et al.

(10) Patent No.: US 10,192,690 B2
(45) Date of Patent: Jan. 29, 2019

(54) TITANIUM OXIDE-BASED SUPERCAPACITOR ELECTRODE MATERIAL AND METHOD OF MANUFACTURING SAME

(71) Applicant: SHANGHAI INSTITUTE OF CERAMICS, CHINESE ACADEMY OF SCIENCES, Shanghai (CN)

(72) Inventors: Fuqiang Huang, Shanghai (CN); Zhou Wang, Shanghai (CN); Chongyin Yang, Shanghai (CN)

(73) Assignee: SHANGHAI INSTITUTE OF CERAMICS, CHINESE ACADEMY OF SCIENCES, Shanghai (CN)

(*) Notice: Subject to any disclaimer, the term of this patent is extended or adjusted under 35 U.S.C. 154(b) by 225 days.

(21) Appl. No.: 15/023,944

(22) PCT Filed: Sep. 29, 2014

(86) PCT No.: PCT/CN2014/087832
§ 371 (c)(1),
(2) Date: Mar. 22, 2016

(87) PCT Pub. No.: WO2015/043538
PCT Pub. Date: Apr. 2, 2015

(65) Prior Publication Data
US 2016/0240328 A1    Aug. 18, 2016

(30) Foreign Application Priority Data

Sep. 29, 2013  (CN) .......................... 2013 1 0455782

(51) Int. Cl.
*H01G 11/46* (2013.01)
*H01G 11/86* (2013.01)
(Continued)

(52) U.S. Cl.
CPC .......... *H01G 11/46* (2013.01); *C01G 23/043* (2013.01); *C04B 35/62259* (2013.01);
(Continued)

(58) Field of Classification Search
CPC ...... H01G 11/46; H01G 11/38; C01G 23/043; C04B 35/62259
See application file for complete search history.

(56) References Cited

U.S. PATENT DOCUMENTS 2,233,917 A * 3/1941 De Boer ................. H01J 19/00
                                                           313/107
6,181,547 B1 * 1/2001 Finello ................... H01G 9/155
                                                           361/508

(Continued)

FOREIGN PATENT DOCUMENTS

| CN | 1826289 A | 8/2006 |
|---|---|---|
| CN | 1849266 A | 10/2006 |
| CN | 101339848 A | 1/2009 |

OTHER PUBLICATIONS

Lu, X. et al., "Hydrogenated TiO2 Nanotube Arrays for Supercapacitors," Nano Letters, vol. 12, No. 3, Mar. 14, 2012, Published Online Feb. 24, 2012, 7 pages.

(Continued)

*Primary Examiner* — David M Sinclair
(74) *Attorney, Agent, or Firm* — Alleman Hall Creasman & Tuttle LLP

(57) ABSTRACT

A titanium oxide-based supercapacitor electrode material and a method of manufacturing same. A reactive substance of the titanium oxide-based supercapacitor electrode material is a conductive titanium oxide. The conductive titanium oxide is a sub-stoichiometric titanium oxide, reduced titanium dioxide, or doped reduced titanium dioxide obtained by further doping an element in reduced titanium dioxide. The titanium oxide-based supercapacitor electrode material (Continued)

has a carrier concentration greater than $10^{18}$ cm$^{-3}$, and the titanium oxide-based supercapacitor electrode material has a specific capacitance 20 F/g to 1,740 F/g at a charge/discharge current of 1 A/g.

22 Claims, 4 Drawing Sheets

(51) Int. Cl.
  *C04B 35/622* (2006.01)
  *C04B 35/628* (2006.01)
  *C01G 23/04* (2006.01)
  *H01G 11/38* (2013.01)

(52) U.S. Cl.
  CPC .. *C04B 35/62857* (2013.01); *C04B 35/62865* (2013.01); *C04B 35/62897* (2013.01); *H01G 11/38* (2013.01); *H01G 11/86* (2013.01); *C01P 2002/52* (2013.01); *C01P 2004/04* (2013.01); *C01P 2006/40* (2013.01); *C04B 2235/3232* (2013.01); *C04B 2235/5284* (2013.01); *Y02E 60/13* (2013.01)

(56) References Cited

U.S. PATENT DOCUMENTS

| | | | |
|---|---|---|---|
| 2003/0036001 A1* | 2/2003 | James | H01G 4/08 429/232 |
| 2008/0050657 A1* | 2/2008 | Nishida | C07D 295/08 429/306 |
| 2008/0112112 A1 | 5/2008 | Takemura et al. | |
| 2010/0044630 A1* | 2/2010 | Kang | B82Y 30/00 252/182.33 |
| 2010/0123096 A1* | 5/2010 | Suzuki | H01M 4/131 252/182.1 |
| 2012/0009477 A1* | 1/2012 | Chen | H01M 4/366 429/224 |
| 2012/0028127 A1* | 2/2012 | Wei | B82Y 30/00 429/300 |
| 2012/0040162 A1* | 2/2012 | Huang | H01L 21/02186 428/220 |
| 2012/0251887 A1* | 10/2012 | Han | H01M 4/366 429/231.5 |
| 2013/0040046 A1* | 2/2013 | Hosoe | H01G 9/0029 427/58 |
| 2013/0255872 A1* | 10/2013 | Zhong | H01M 4/04 156/242 |
| 2014/0004417 A1* | 1/2014 | Sano | H01M 4/5825 429/211 |

OTHER PUBLICATIONS

Lu, X. et al., "H-TiO2@MnO2//H-TiO2@C Core-Shell Nanowires for High Performance and Flexible Asymmetric Supercapacitors," Advanced Materials, vol. 25, No. 2, Jan. 11, 2013, Published Online Oct. 19, 2012, 6 pages.

ISA State Intellectual Property Office of the People's Republic of China, International Search Report Issued in Application No. PCT/CN2014/087832, dated Jan. 6, 2014, WIPO, 4 pages.

Moon, G. et al., "Nitridation and Layered Assembly of Hollow TiO2 Shells for Electrochemical Energy Storage," Advanced Functional Materials, vol. 24, No. 6, Feb. 12, 2014, Published Online Sep. 19, 2013, 9 pages.

* cited by examiner

TITANIUM OXIDE-BASED SUPERCAPACITOR ELECTRODE MATERIAL AND METHOD OF MANUFACTURING SAME

FIELD OF THE INVENTION

The present invention relates to a supercapacitor electrode material with conductive, nanostructured titanium oxide as an active substance, and particularly to a method for activating the pseudocapacitive energy storage performance of titanium dioxide by reduction and/or doping modification and applying it to supercapacitors.

BACKGROUND OF THE INVENTION

At present, the energy crisis and global warming have become major issues affecting human survival and development, and thus the demand for development of clean renewable energy such as wind energy and solar energy is increasing. However, due to the instability of power stations of wind and solar power generation and centralized supplying solution therefrom, one precondition for large-scale use of these energy sources is the development of suitable high-capacity high-power energy storage devices. Using the transportation system with the most representative energy storage needs as an example, the most successful solution at present is a secondary chemical battery (such as a lithium-ion battery) used in small electric vehicles. Such a battery has a high specific energy but a low power density of no more than 500 W/kg, and generates internal heat and warms up during a discharge under a large pulse current or a fast charging, thus reducing the service life of the battery, and even causing danger. For buses, freight cars, and high speed railways with higher power needs, it is clear that secondary chemical batteries are unable to meet such needs. This requires a new energy storage system which can provide both a high capacity and a high power.

An electrochemical capacitor, also known as a supercapacitor, is a new energy storage device developed since the 1970s and 1980s, and a new energy storage system with a performance and a working mechanism between electronic capacitors and chemical batteries. It dramatically increases the upper limit of the capacitance by 3 to 4 orders of magnitude, reaching a high capacitance of a Farad (F) level. Currently, commonly used secondary batteries such as nickel cadmium batteries, nickel metal hydride batteries, and lithium ion batteries have a high specific energy but a low power density of no more than 500 W/kg, and generate internal heat and warm up in a large pulse current discharge or a fast charging, thus reducing the service life of such batteries, and even causing danger. Fuel cells also have defects of low power density, and low resistance to high pulse charging and discharging. The supercapacitor, as a new energy storage element, has a performance between conventional electrostatic capacitors and batteries, with the following features: 1. high energy density (1~10 Wh/kg); 2. high power density (2 kw/kg), and high-current discharge (several thousand amperes); 3. long service life (more than 100,000 times); 4. wide temperature range (−40~70° C.); 5. high charging speed (tens of seconds); 6. long shelf life (several years); 7. maintenance-free and environmentally friendly. These features meet the demands for new energy and energy storage devices with the higher energy density and power density required by the development of science and technology and improvement of human living standards, and have important and broad application prospects in the fields of mobile communications, information technology, consumer electronics, electric vehicles, and aerospace, and are thus receiving more and more attention in the world.

There are two types of supercapacitor materials based on the working mechanisms thereof. One type is a double-layer supercapacitor material, which stores energy mainly based on a directed migration of electrolyte ions in a surface of the electrode. Therefore, the specific surface area of the electrode material has an important influence on the double layer capacitance. Carbon materials (e.g. carbon nanotubes, activated carbon, graphene, etc.) are widely used as electrode materials for double-layer capacitors due to their large specific surface area and stability. Activated carbon, a representative of carbon materials, is now used in the vast majority of the commercial supercapacitors. Due to limitations of the double-layer energy storage, this type of capacitor generally has a specific capacitance of less than 300 F/g, making the energy density thereof much less than the application requirements. Another type, called redox Faraday pseudocapacitive material, stores energy mainly by means of the redox reaction of the electrode material. The energy storage mechanism of rapid insertion and extraction of ions in the surface of the material makes such material have a higher specific capacitance. Representatives of the material are certain transition metal oxides (such as ruthenium oxide, manganese dioxide, nickel oxide, cobaltosic oxide, etc.) and conductive polymers (such as polyaniline, polypyrrole, etc.). However, the commonly used supercapacitor materials above all have problems in practical application, for example, double-layer capacitor materials such as carbon material have shortcomings of low capacitance and high production cost; since their electrochemical window can only be positive, manganese dioxide and nickel oxide cannot be made into a symmetric device, have a large internal resistance which restricts the power density, and greatly attenuate after thousands of cycles (nickel oxide attenuates in capacitance by 60% after 1,000 cycles), thus greatly limiting the application on devices; ruthenium oxide has a high specific capacitance and a symmetric electrochemical window but has a high cost because the noble metal ruthenium is expensive; and conductive polymers have a large internal resistance which restricts the power density of device, thus being limited in practical applications.

Unmodified white titanium dioxide material, as a variable valence oxide of lightest molar mass, can undergo a $Ti^{4+}/Ti^{3+}$ redox pseudocapacitive reaction theoretically and has a theoretical capacitance up to 2,000 F/g, but actually exhibits a very low specific capacitance ($<0.1$ mF cm$^{-2}$), and a poor electrical conductivity, and has never been considered as an available active material for supercapacitors. At present, titanium dioxide is used in supercapacitors substantially in such a manner that titanium dioxide is nano-structured, and compounded with conventional supercapacitor materials (such as manganese oxide, polymers, etc.), wherein titanium dioxide merely serves as a supporter with a large specific surface area to improve the performance of the conventional capacitors. Yat Li has reported that $MnO_2$ is supported on hydrogenated black titanium dioxide nanowires to give an asymmetric supercapacitor device (Lu, X.; Yu, M.; Wang, G.; Zhai T.; Xie, S.; Ling, Y.; Tong, Y.; Li, Y. Adv. Mater., 2013, 25, 267-272), however, the titanium dioxide nanowires are used to improve the conductivity of the current collector by hydrogenation, rather than serving as an active materials. Even the surface conductivity and density of charge carriers are improved after a surface hydrogenation treatment, the electrode with titanium dioxide as the main active material only has a capacitance of ~1-3.2 mF cm$^{-2}$ according to a report (Lu, X.; Wang, G.; Zhai T.; Yu, M.; Gan, J.; Tong, Y.; Li, Y. Nano Lett, 2012, 12, 1690-1696), which is much less than that of conventional supercapacitor materials. Recently, Yadong Li has reported a nitrided titanium dioxide supercapacitor. However, the capacitance thereof only improves in the case that titanium dioxide is nitrided at a high temperature to generate titanium nitride, while a sample without a titanium dioxide component due to a low temperature nitriding treatment does not have an improved capacitance. It is thus clear that the active substance is titanium nitride rather than titanium dioxide (Moon, G.; Joo, J.; Dahl, M; Jung, H.; Yin, Y. Adv. Funct. Mater., 2013, DOI:10.1002/adfm. 201301718). So far, a better capacitance performance has only been obtained in the case that high-temperature hydrogenated titanium oxide arrays serve as a current collector and active materials manganese oxide are supported thereon (Lu, X.; Yu, M.; Wang, G.; Zhai T.; Xie, S.; Ling, Y.; Tong, Y.; Li, Y. Adv. Mater., 2013, 25, 267-272).

SUMMARY OF THE INVENTION

In light of the problem the existing supercapacitor materials have, an object of the present invention is to provide a high power density, high energy density, and low-cost supercapacitor electrode material, a supercapacitor electrode prepared thereby, and a method for preparing the supercapacitor electrode.

Herein, in one aspect, the present invention provides a titanium dioxide-based supercapacitor electrode material, comprising a conductive titanium oxide as the active substance, wherein the conductive titanium oxide is selected from the group consisting of titanium sub-oxide, reduced titanium dioxide, and doped reduced titanium dioxide obtained by element doping of reduced titanium dioxide, and the titanium dioxide-based supercapacitor electrode material has a density of charge carrier higher than $10^{18}$ cm$^{-3}$, and a specific capacitance in a range of 20 F/g~1,740 F/g, preferably 54~1,670 F/g, under a charge-discharge current of 1 A/g.

Preferably, the specific capacitance of the titanium oxide-based supercapacitor electrode material is in a range of 20 F/g~1,872 F/g at a charge-discharge rate of 2 mV/s, 15 F/g~1,130 F/g at a charge-discharge rate of 10 mV/s, 10 F/g~930 F/g at a charge-discharge rate of 50 mV/s, and 10 F/g~571 F/g at a charge-discharge rate of 100 mV/s, respectively. The specific capacitance of the titanium oxide-based supercapacitor electrode material has an attenuation of less than 5% after 1,000 cycles, less than 8% after 5,000 cycles, and less than 10% after 10,000 cycles, respectively.

The titanium oxide-based electrode material can serve as a positive electrode active material, a negative electrode active material, or a synergic material in a supercapacitor. The titanium oxide-based positive electrode material can be used to construct a symmetric supercapacitor with both of the positive electrode and the negative electrode comprising the titanium oxide-based active material.

Preferably, a whole or a surface of the titanium sub-oxide, the reduced titanium dioxide, or the doped reduced titanium dioxide has amorphous layers comprising defect structures, wherein the doping element includes a metal element and/or a non-metal element, the metal element is one or more elements selected from the group consisting of vanadium, chromium, manganese, iron, cobalt, nickel, copper, niobium, molybdenum, tantalum, ruthenium, silver, platinum, tungsten, cadmium, and rhodium, and the non-metal element is one or more elements selected from the group consisting of hydrogen, nitrogen, carbon, boron, sulfur, selenium, phosphorus, fluorine, chlorine, bromine, and iodine.

The present invention uses a conductive titanium oxide as the active substance, and submits it to a reduction and/or doping treatment to form a reduced titanium dioxide having a $TiO_{2-x}$ amorphous shell comprising defect structures and $Ti^{3+}$ on the surface thereof. The amorphous shell comprises a large number of activated trivalent titanium ions and can prevent them from oxidation so that they are stabilized. Additionally, the loose amorphous structure enables the hydrogen ions and alkali metal ions in the electrolyte to be inserted and extracted rapidly, so that an excellent pseudo-capacitance is provided. Further, the vacancy-rich structure makes it possible to dope non-metal elements (hydrogen, nitrogen, carbon, boron, sulfur, selenium, phosphorus, fluorine, chlorine, bromine, iodine, etc.) and metal elements (vanadium, chromium, manganese, iron, cobalt, nickel, copper, niobium, molybdenum, tantalum, ruthenium, silver, platinum, tungsten, cadmium, rhodium, etc.) into the surface of the reduced titanium dioxide, so as to adjust the $Ti^{3+}$ content and the conductivity to obtain a higher specific capacitance (which can be greater than 1,600 F/g). A symmetric supercapacitor device made from the black titanium dioxide supercapacitor electrode has a high power density (98 kW kg$^{-1}$), a high energy density (110 Wh kg$^{-1}$), and a high cycle stability (7% attenuation after 5,000 cycles).

Preferably, the thickness of the amorphous layer is 0.5 nm or more, preferably 2~10 nm. The defect structure in the whole or surface of the titanium sub-oxide, the reduced titanium dioxide, or the doped reduced titanium dioxide includes oxygen vacancies, interstitial titanium, and/or direct bonding between titanium and titanium. The apparent color of the reduced titanium dioxide or the doped reduced titanium dioxide ranges from yellow to green to brown to blue to gray to black depending on the conductivity, and the density of the charge carriers of the powder ranges from $10^{18}$ to $10^{22}$ cm$^{-3}$.

In another aspect, the present invention provides a titanium oxide-based supercapacitor electrode comprising the titanium oxide-based supercapacitor electrode material above, the active substance of the titanium oxide-based supercapacitor electrode being selected from the group consisting of the titanium sub-oxide, the reduced titanium dioxide, and the doped reduced titanium dioxide obtained by element doping of the reduced titanium dioxide.

As an example, the titanium oxide-based supercapacitor electrode of the present invention formed by the supercapacitor electrode material is a titanium dioxide-based electrode supported by a conductive substrate, wherein the electrode comprises a conductive substrate, and the reduced titanium dioxide or the doped reduced titanium dioxide supported on the conductive substrate. The conductive substrate includes a metal substrate, a carbon material substrate, and a conductive glass selected from the group consisting of FTO, ITO, AZO, ZnO:B, ZnO:Ga, ZnO:In, $Cd_2SnO_4$, $Zn_2SnO_4$, $TiO_2$:Nb, $SrTiO_3$:Nb, CuS, $CuAlO_2$, and $CuAlS_2$.

As another example, the titanium oxide-based supercapacitor electrode of the present invention formed by the supercapacitor electrode material is a free-standing titanium dioxide-based supercapacitor electrode formed by the titanium sub-oxide, the reduced titanium dioxide, or the doped reduced titanium dioxide.

In another aspect, the present invention further provides a first method for preparing the titanium oxide-based supercapacitor electrode above, comprising: performing a high surface reduction treatment on titanium dioxide to obtain titanium sub-oxide or reduced titanium dioxide, or performing a high surface reduction treatment and a doping treatment on titanium dioxide to obtain doped reduced titanium dioxide;

mixing the titanium sub-oxide, the reduced titanium dioxide, or the doped reduced titanium dioxide with a solvent and an aid to obtain a slurry; and coating the slurry on a conductive substrate followed by drying to obtain a conductive substrate-supporting titanium dioxide-based supercapacitor electrode, or drying the slurry followed by milling and tabletting to obtain a free-standing titanium dioxide-based supercapacitor electrode.

In the present invention, the aid may include a binder, a conductive agent, etc. The conductive agent may be one or more agents selected from the group consisting of acetylene black, carbon black, vapor grown carbon fibers, carbon nanotubes, and metal fibers. The binder may be one or more agents selected from the group consisting of polytetrafluoroethylene, polyvinylidene fluoride, polyethylene, polypropylene, polyacrylamide, ethylene-propylene-diene copolymer resin, styrene-butadiene rubber, polybutadiene, fluorine rubber, polyethylene oxide, polyvinyl pyrrolidone, polyester resins, acrylic resins, phenolic resins, epoxy resins, polyvinyl alcohol, and hydroxypropyl cellulose.

In the method above, the step of performing a high surface reduction treatment on titanium dioxide to obtain titanium sub-oxide or reduced titanium dioxide comprises performing a high surface reduction treatment on titanium dioxide using a highly active metal or under a reducing atmosphere to obtain reduced titanium dioxide.

The step of performing a high surface reduction treatment and a doping treatment on titanium dioxide to obtain doped reduced titanium dioxide comprises: performing a high surface reduction treatment on titanium dioxide using a highly active metal or under a reducing atmosphere followed by performing a metal and/or non-metal doping treatment; or performing a metal and/or non-metal doping treatment on titanium dioxide followed by performing a high surface reduction treatment on the doped titanium dioxide using a highly active metal or under a reducing atmosphere, to obtain doped reduced titanium dioxide.

Preferably, the solvent is one or more solvents selected from the group consisting of water, alcohols, polyols, terpenes, N-methyl-2-pyrrolidone, dimethyl carbonate, diethyl carbonate, ethyl acetate, and methyl propionate.

Preferably, in the slurry, the concentration of the titanium sub-oxide, the reduced titanium dioxide, or the doped reduced titanium dioxide is 0.001~1 g/mL, the concentration of the binder is 1~50 mg/mL, and the mass ratio of the conductive agent to the reduced titanium dioxide or the doped reduced titanium dioxide is (0.05~10):1.

Preferably, the coating method is one or more methods selected from the group consisting of dip-coating, knife coating, spin coating, spray coating, screen printing, and suspended particles dip coating.

In another aspect, the present invention further provides a second method for preparing the titanium oxide-based supercapacitor electrode above, comprising:

applying titanium dioxide on a conductive substrate followed by drying to obtain a conductive substrate-supporting titanium dioxide electrode, or drying a slurry containing titanium dioxide followed by milling and tabletting to obtain a free-standing titanium dioxide electrode; and performing a high surface reduction treatment and/or a doping treatment on the conductive substrate-supporting titanium dioxide electrode or the free-standing titanium dioxide electrode to obtain the supercapacitor electrode.

In the method above, the high surface reduction treatment and/or doping treatment may be:

performing a high surface reduction treatment on the conductive substrate-supporting titanium oxide electrode or the free-standing titanium oxide electrode using a highly active metal or under a reducing atmosphere;

performing a high surface reduction treatment on the conductive substrate-supporting titanium oxide electrode or the free-standing titanium oxide electrode using a highly active metal or under a reducing atmosphere followed by performing a metal and/or non-metal doping treatment; or performing a metal and/or non-metal doping treatment on the conductive substrate-supporting titanium oxide electrode or the free-standing titanium oxide electrode followed by performing a high surface reduction treatment using a highly active metal or under a reducing atmosphere.

Preferably, the method for applying may be one or more methods selected from the group consisting of dip-coating, knife coating, spin coating, spray coating, screen printing method, suspended particles dip coating, anodic electrodeposition, cathodic electrodeposition, electrophoresis, spray pyrolysis, chemical vapor deposition, and physical vapor deposition.

Preferably, the high surface reduction treatment and/or the doping treatment are performed at 200~1,000° C. for 2~12 hours. The high surface reduction treatment is preferably performed at 300~500° C. The doping treatment is preferably performed at 400~600° C.

Preferably, the titanium dioxide has one or more phases selected from the group consisting of amorphous phase, anatase phase, rutile phase, and brookite phase; and the titanium dioxide has one or more morphologies selected from the group consisting of ball, rod, strip, tube, and irregular polygons.

In the present invention, a reduction treatment and/or a doping treatment are employed to take oxygen from the surface of titanium dioxide, so that an amorphous layer comprising defect structures and $Ti^{3+}$ is formed at the surface of titanium dioxide, resulting in a change of the insulating properties of intrinsic titanium oxide and an improvement of the conductivity of the resulting titanium dioxide, making the resulting titanium dioxide a suitable active substance for supercapacitor materials. According to the methods of the present invention, a large-scale treatment can be directly performed on titanium dioxide powders and a conductive substrate with titanium dioxide supported thereon to obtain a high-performance titanium dioxide supercapacitor. As compared with the conventional ultracapacitors, the material of the present invention is low in cost, has little requirement of equipment, and can be prepared in a short period, and the prepared capacitor has a high energy density, a high power density, and a high cycle stability, thus having broad prospective applications. The present invention uses titanium oxide as the active substance, and submits it to a reduction and/or doping treatment, to give a titanium dioxide supercapacitor device with a high power density, a high energy density, and a high cycle stability. The methods provided herein have a good controllability for process, are simple in process and low in cost, can prepare a high-performance supercapacitor device, and are suitable for industrial production.

In the present invention, the titanium oxide-based supercapacitor electrode materials can serve as a synergic material, that is, the conductive titanium oxide material can be used together with other active substances for supercapacitors to synergistically improve the performance of supercapacitors, specifically, to significantly improve the electrochemical stability and capacitance of the conventional pseudocapacitive materials such as transition metals and organic conductive polymers, and to improve the specific capacitance of the carbon-based double-layer capacitors.

DETAILED DESCRIPTION OF THE EMBODIMENTS

The present invention will be further described with the following embodiments below with reference to the drawings. It should be understood that the drawings and the following embodiments are only used for explaining this invention, and do not limit this invention.

The present invention aims to overcome the problems (such as not taking into account the energy density and power density, high cost, incapability of being made into a symmetric device, the cycle of poor performance, etc.) of the conventional supercapacitor materials, to provide a supercapacitor electrode material with a higher power density, a higher energy density, and a better cyclicity using titanium oxide as the main active substance, a supercapacitor electrode prepared by the material, and a method for preparing the supercapacitor electrode. In the present invention, a reduction treatment and/or a doping treatment are employed to create defects at the surface of the titanium dioxide material which is insulative in the intrinsic state, so that the titanium oxide has a certain conductivity, and thus can be used in a supercapacitor. The titanium oxide-based supercapacitor prepared in the present invention has the advantages of high energy density (20~111.8 Wh/kg), high power density (1~98 kW/kg) and good cyclicity (80%~98% retention after 10,000 cycles), and low cost, thus having broad prospective applications.

Firstly, the present invention provides a doped reduced titanium dioxide supercapacitor electrode material, the supercapacitor electrode material including reduced titanium dioxide and doped reduced titanium dioxide, which at their surface have amorphous layers comprising defect-structures and activated $Ti^{3+}$, wherein the doping element includes metal and/or non-metal elements, the metal element is one or more elements selected from the group consisting of vanadium, chromium, manganese, iron, cobalt, nickel, copper, niobium, molybdenum, tantalum, ruthenium, silver, platinum, tungsten, cadmium, and rhodium, the non-metal element is one or more elements selected from the group consisting of hydrogen, nitrogen, carbon, boron, sulfur, selenium, phosphorus, fluorine, chlorine, bromine, and iodine. The defect structure includes oxygen vacancies, interstitial titanium, and/or direct bonding between titanium and titanium. The apparent color of the reduced titanium dioxide or the doped reduced titanium dioxide ranges from yellow to green to brown to blue to gray to black depending on the conductivity, and the density of the charge carriers of the powder ranges from $10^{18}$ to $10^{22}$ $cm^{-3}$. The reduced titanium dioxide or the doped reduced titanium dioxide may be supported on a conductive substrate to form an electrode, or form a free-standing electrode without a supporter by direct tabletting.

Figure 3:
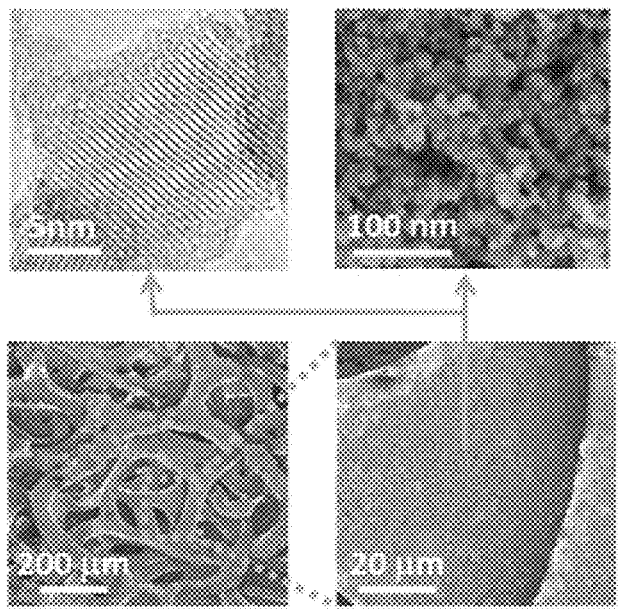
FIG. 3 shows TEM and SEM images of the nano titanium dioxide supported on a nickel net by means of the method provided herein.

As shown in the TEM image of FIG. 3, amorphous layers with a thickness of 1 nm or more, for example 2~10 nm, are formed at the surface of the conductive titanium oxide (the reduced titanium dioxide or the doped reduced titanium dioxide). The amorphous layers comprise a large number of activated trivalent titanium ions and can prevent them from oxidation so that they are stabilized. Additionally, the loose amorphous structure enables the hydrogen ions and alkali metal ions in the electrolyte to be inserted and extracted rapidly, so that an excellent pseudocapacitance is provided. Further, the vacancy-rich structure makes it possible to dope non-metal elements (hydrogen, nitrogen, carbon, boron, sulfur, selenium, phosphorus, fluorine, chlorine, bromine, iodine, etc.) and metal elements (vanadium, chromium, manganese, iron, cobalt, nickel, copper, niobium, molybdenum, tantalum, ruthenium, silver, platinum, tungsten, cadmium, rhodium, etc.) into the surface, so as to adjust the $Ti^{3+}$ content and the conductivity to obtain a higher specific capacitance. In the present invention, a specific capacitance higher than 1600 F/g can be reached through nitrogen doping. A symmetric supercapacitor device made from the supercapacitor electrode material has a high power density (98 kW $kg^{-1}$), a high energy density (111 Wh $kg^{-1}$), and a high cycle stability (7% attenuation after 5,000 cycles).

The conductive substrate includes, but is not limited to, a metal substrate, a carbon material substrate, and a conductive glass selected from the group consisting of FTO, ITO, AZO, ZnO:B, ZnO:Ga, ZnO:In, $Cd_2SnO_4$, $Zn_2SnO_4$, $TiO_2$:Nb, $SrTiO_3$:Nb, CuS, $CuAlO_2$, and $CuAlS_2$.

The present invention further provides two methods for preparing the two supercapacitor electrodes above.

The first preparation method (a) comprises: performing a high surface reduction treatment and/or a doping treatment on titanium dioxide to obtain a reduced titanium dioxide or a doped reduced titanium dioxide; mixing the doped reduced titanium dioxide with aids (such as conductive agent and binder) and solvent to obtain a slurry; and coating the slurry on a conductive substrate followed by drying to obtain a conductive substrate-supporting electrode, or directly drying the slurry followed by tabletting. The high surface reduction treatment may be prior to the doping treatment, for example, titanium dioxide is submitted to a high surface reduction treatment using a highly active metal or under a reducing atmosphere to obtain a reduced titanium dioxide; and the reduced titanium dioxide is submitted to a metal or non-metal doping treatment to obtain a doped reduced titanium dioxide. However, it should be understood that the doping treatment may be prior to the reduction treatment.

The second preparation method (b) comprises: applying titanium oxide on a conductive substrate followed by drying to obtain an electrode provided with titanium oxide, or drying a slurry containing titanium oxide followed by tabletting to obtain a free-standing electrode; and performing a high surface reduction treatment and a doping treatment on the electrode provided with titanium oxide or the free-standing titanium oxide electrode to obtain the titanium oxide-based supercapacitor electrode material. The high surface reduction treatment may be prior to the doping treatment, for example, the electrode provided with titanium oxide is submitted to a high surface reduction treatment using a highly active metal or under a reducing atmosphere to obtain an electrode provided with reduced titanium dioxide; and the electrode provided with reduced titanium dioxide is submitted to a metal or non-metal doping treatment to obtain a doped reduced titanium dioxide supercapacitor electrode material. However, it should be understood that the doping treatment may be prior to the reduction treatment.

In the first preparation method (a) and/or the second preparation method (b), the titanium dioxide as the raw material includes, but is not limited to, one or more phases selected from the group consisting of amorphous phase, anatase phase, rutile phase, and brookite phase. The morphology thereof includes, but is not limited to, one or more morphologies selected from the group consisting of ball, rod, strip, tube, and irregular polygons. The titanium dioxide may be commercial or self-made, for example, be prepared through hydrolysis of titanium tetrachloride.

The highly active metal used includes, but is not limited to, one or more metals selected from the group consisting of lithium, magnesium, aluminum, calcium, gallium, strontium, indium, and barium. The reducing atmosphere includes, but is not limited to, a mixture of hydrogen and argon, wherein the ratio of argon to hydrogen may be (0~20):1.

Hereinafter, a process according to the first preparation method (a) will be described as an example.

(a-1) The high surface reduction treatment on titanium dioxide.

Titanium dioxide is submitted to a high surface reduction treatment using a highly active metal or under a reducing atmosphere to obtain reduced titanium dioxide.

The reduction method using a highly active metal includes, but is not limited to, one of or a combination of a dual-temperature-zone metal-aided reduction method and a metal-mixed with-titanium dioxide vacuum annealing method.

Taking the dual-temperature-zone metal-aided reduction method as an example, it may comprise the following steps.

1) A highly active metal and a titanium dioxide power are placed in different heating sections in a sealed container, respectively, and the container is vacuumized to a specified negative pressure. The container may be a sealable and heatable tube furnace. The titanium dioxide and the highly active metal (e.g., aluminum) are placed in different positions spaced apart from each other in a sealed system so as to receive different heating environments. The specified negative pressure may be less than 30 Pa, preferably less than 1 Pa, for example, less than 0.1 Pa.

2) The section in which the highly active metal is placed and the section in which the titanium dioxide is placed are heated to different temperatures. Specifically, the highly active metal is placed in a section with a higher temperature (a first temperature, e.g., 500~1500° C., preferably 700~1,000° C.), and the titanium dioxide is placed in a section with a lower temperature (a second temperature, e.g., 100~600° C., preferably 300~500° C.), such that a dual-temperature-zone reduction system is realized by a simple device. Under the negative pressure, the highly active metal is heated to react with the oxygen in the system, thus lowering the oxygen partial pressure of the whole system. Once the oxygen partial pressure is lower than the equilibrium oxygen partial pressure of titanium dioxide, the titanium dioxide is reduced, and thus, a reduced titanium dioxide is obtained.

3) After a treatment for 2~12 h, the heating power is turned off. The sample cools down, and a reduced titanium dioxide powder is obtained.

Figure 1:
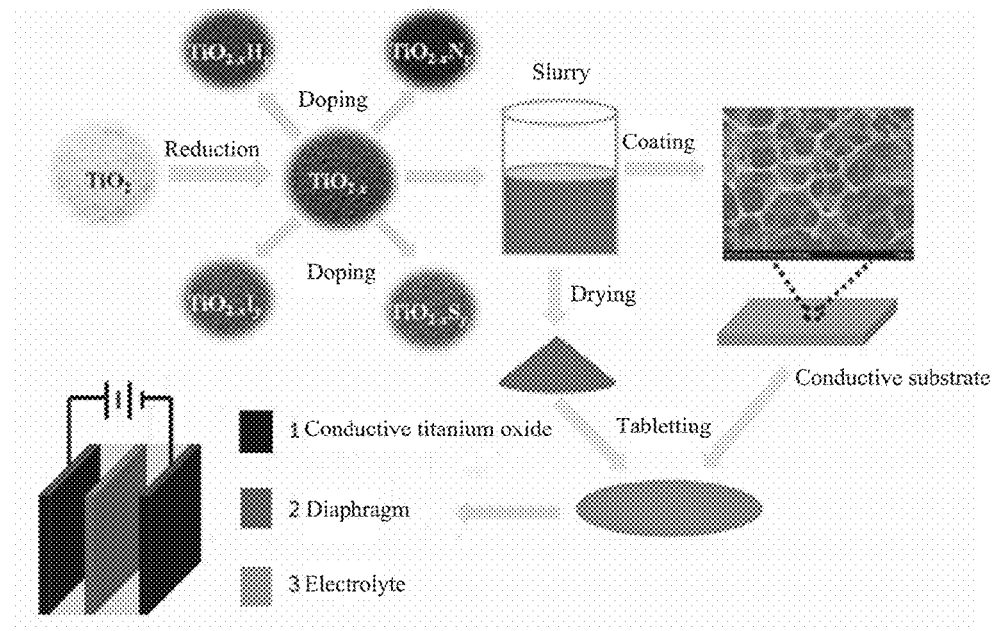
FIG. 1 shows pictures of a reduced nano titanium dioxide powder ($TiO_{2-x}$) obtained by reduction of intrinsic $TiO_2$ and doped reduced titanium dioxide powders obtained by hydrogen-doping ($TiO_2$—H), nitrogen-doping ($TiO_2$—N), sulfur-doping ($TiO_2$—S), and iodine-doping ($TiO_2$—I) for the reduced titanium dioxide, by means of the method provided herein; and a flowchart of using a reduced titanium dioxide powder or a doped reduced titanium dioxide powder as the active substance to prepare a slurry then to prepare a high-efficiency titanium dioxide supercapacitor electrode material.
Figure 2:
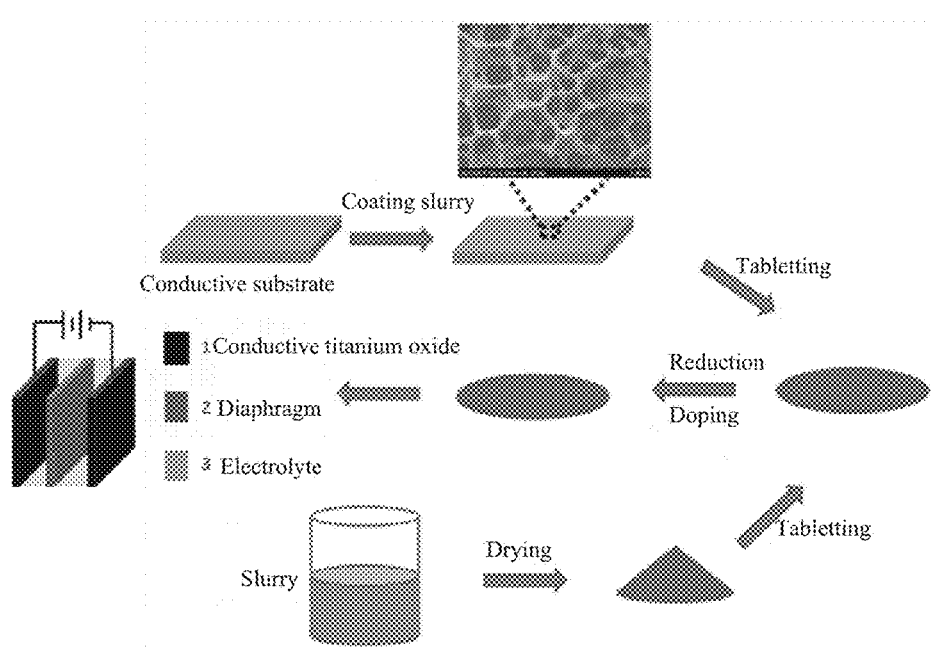
FIG. 2 shows a flowchart of using the intrinsic $TiO_2$ as the active substance to prepare a slurry then to prepare a titanium dioxide electrode material, and performing a reduction treatment and a doping treatment on the electrode material to obtain a high-efficiency $TiO_2$ supercapacitor electrode material, by means of the method provided herein.

FIG. 1 shows a picture of a reduced titanium dioxide powder ($TiO_{2-x}$) obtained by reduction treatment using aluminum as the highly active metal. As shown in FIG. 1, the reduced sample turned black.

The metal-mixed with-titanium dioxide vacuum annealing method may comprise the following process: a highly active metal is mixed with a titanium dioxide powder, and the resulting mixture is heated to 200~1,000° C. (preferably 300~500° C.) so that the titanium dioxide is reduced.

The method of performing a reduction treatment on titanium dioxide under a reducing atmosphere includes, but is not limited to, one or more methods selected from the group consisting of a high-temperature annealing method, a high-pressure annealing method, and a plasma-assisted method.

Taking the plasma-assisted method as an example, it may comprise the following steps.

1) A titanium dioxide powder is placed in a sealed container, and the system is vacuumized to a base pressure lower than 30 Pa, preferably lower than 1 Pa, for example lower than 0.1 Pa. The sealed system used may, for example, be a sealable and heatable tube furnace.

2) RF gas (hydrogen or a mixture of argon and hydrogen (with a molar ratio of 0~20):1)) is supplied to the sealed container as vacuumized in step 1). Herein, the sealed system may be supplied with hydrogen or a mixture of argon and hydrogen at the same time of vacuumizing in advance, so as to expel the residual oxygen from the sealed system, before being supplied with the gas above.

3) The sealed container after step (b) is heated to 100~600° C., preferably 300~500° C.

4) Once the sealed container is heated to a target temperature as mentioned in step 3), the gas flow is regulated in such a manner that the pressure inside the container is maintained at 50~500 Pa, preferably 100~300 pa, and the RF power is turned on, with the power thereof being 50~500 W, preferably 100~300 W, so that the gas in the container is ionized to generate plasma. Such treatment lasts for 2~12 h.

5) After the treatment, the RF power and the heating power are turned off successively. After the sample cools down, the gas flow is cut off. Thus, a reduced titanium dioxide powder is obtained.

(a-2) The doping treatment for the reduced titanium dioxide powder.

The reduced titanium dioxide powder is submitted to a non-metal (hydrogen, nitrogen, carbon, boron, sulfur, selenium, phosphorus, fluorine, chlorine, bromine, iodine, etc.) doping and/or a metal (vanadium, chromium, manganese, iron, cobalt, nickel, copper, niobium, molybdenum, tantalum, ruthenium, silver, platinum, tungsten, cadmium, rhodium, etc.) doping to give a doped reduced titanium dioxide. Taking nitrogen-doping as an example, the process may comprise the following steps: the reduced titanium dioxide powder is placed in a sealed container, and the sealed container is supplied with ammonia gas, and heated to 200~1,000° C. (preferably 400~600° C.) and kept thereat for 2~12 h (preferably 4~8 h) to give a nitrogen-doped reduced titanium dioxide powder. Doping of other non-metal elements and/or metal elements can be conducted using a corresponding dopant referring to the method above or by other methods. For example, in the case of sulfur doping, hydrogen sulfide can be supplied to the sealed container which is heated to 200~1,000° C. (preferably 400~600° C.) and kept thereat for 2~12 h (preferably 4~8 h) to give a sulfur-doped reduced titanium dioxide powder.

(a-3) The doped reduced titanium dioxide powder and a conductive agent are added to a solvent in which a binder is dispersed, and uniformly stirred to get a slurry in which the concentration of the doped reduced titanium dioxide powder is 0.1~1 g/mL, and the concentration of the binder is 10~50 mg/mL. The conductive agent used includes, but is not limited to, one or more conductive agents selected from the group consisting of acetylene black, carbon black, artificial graphite, natural graphite, flake graphite, vapor grown carbon fibers, carbon nanotubes, metal powders, and metal fibers. The binder used includes, but is not limited to, one or more binders selected from the group consisting of polytetrafluoroethylene, polyvinylidene fluoride, polyethylene, polypropylene, polyacrylamide, ethylene-propylene-diene copolymer resin, styrene-butadiene rubber, poly butadiene, fluorine rubber, polyethylene oxide, polyvinyl pyrrolidone, polyester resins, acrylic resins, phenolic resins, epoxy resins, polyvinyl alcohol, and hydroxypropyl cellulose. The solvent used includes, but is not limited to, one or more solvents selected from the group consisting of water, alcohols, polyols, terpenes, N-methyl-2-pyrrolidone, dimethyl carbonate, diethyl carbonate, ethyl acetate, and methyl propionate carbonate.

(a-4) The slurry is uniformly coated on a conductive substrate, and the solvent is dried, to give the doped reduction titanium dioxide supercapacitor electrode of the present invention. The method for coating includes, but is not limited to, one or more methods selected from the group consisting of dip-coating, knife coating, spin coating, spray coating, screen printing, suspended particles dip coating. Alternatively, the powder obtained by drying the slurry is submitted to tabletting to give the free-standing doped reduction titanium dioxide supercapacitor electrode of the present invention.

Hereinafter, a process according to the second preparation method (b) will be described as an example.

(b-1) Titanium dioxide is uniformly applied to a conductive substrate to give an electrode provided with titanium dioxide. The method for applying includes, but is not limited to, one or more methods selected from the group consisting of dip-coating, knife coating, spin coating, spray coating, screen printing method, suspended particles dip coating, anodic electrodeposition, cathodic electrodeposition, electrophoresis, spray pyrolysis, chemical vapor deposition, and physical vapor deposition. Alternatively, the powder obtained by drying the slurry is submitted to tabletting to give the free-standing titanium dioxide supercapacitor electrode.

(b-2) The titanium dioxide electrode is submitted to a high surface reduction treatment. This treatment may refer to step (a-1), except that the titanium dioxide in step (a-1) is replaced by the titanium dioxide electrode. After this step, a reduced titanium dioxide electrode is obtained.

(b-3) The reduced titanium dioxide electrode is submitted to a doping treatment. This treatment may refer to step (a-2), except that the reduced titanium dioxide in step (a-2) is replaced by the reduced titanium dioxide electrode. After this step, a doped reduced titanium dioxide electrode material of the present invention is obtained.

Figure 4:
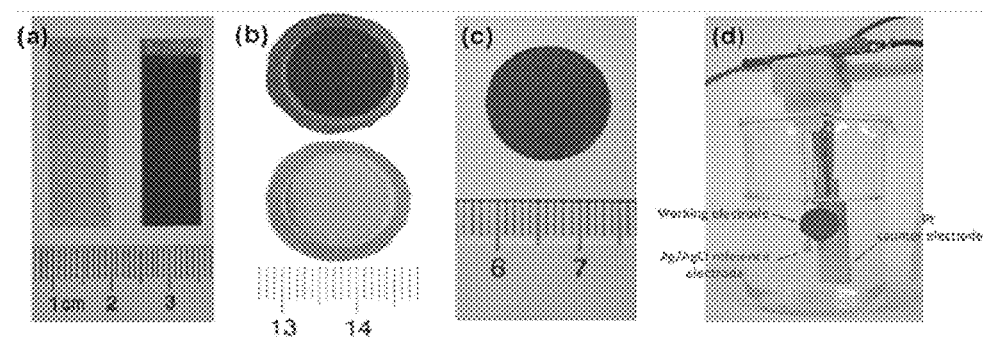
FIG. 4 shows pictures of titanium oxide supercapacitor electrodes obtained by coating a slurry on a nickel net at (a), situ growing on a titanium sheet through anodizing at (b), and milling and tabletting (a free-standing electrode) at (c); and a picture of a three-electrode electrochemical test at (d).

FIG. 4 at (a) shows a picture of a Ni net coated with a self-made amorphous titanium dioxide powder before treatment and a picture of a Ni net coated with a nitrogen-doped black amorphous titanium dioxide powder which is obtained by a reduction treatment at 500° C. for 8 hours using aluminum metal as the highly active metal followed by a nitriding treatment at 600° C. for 4 hours under ammonia gas, according to the second preparation method (b) of the present invention. It can be seen from FIG. 4 at (a) that the amorphous titanium dioxide powder coated on the Ni net turned black after the reduction and nitriding treatments.

FIG. 4 at (b) shows a pictorial comparison between a titanium dioxide electrode material prepared by growing titanium dioxide nanotubes on a titanium sheet through anodizing, and a supercapacitor electrode obtained by submitting this titanium dioxide electrode material to a reduction treatment using aluminum metal as the highly active metal at 300° C., 400° C., and 500° C. respectively for 8 hours followed by a nitriding treatment at 600° C. for 4 hours under ammonia gas, according to the second preparation method (b) of the present invention.

FIG. 4 at (c) shows a picture of a free-standing supercapacitor electrode obtained by a process that a black P25 powder is concocted to a slurry, then the slurry is dried and tableted, with the black P25 powder being prepared by a reduction treatment using aluminum metal as the highly active metal at 300° C., 400° C., and 500° C. respectively for 8 hours followed by a nitriding treatment at 600° C. for 4 hours under ammonia gas, according to the first preparation method (a) of the present invention.

Figure 5A:
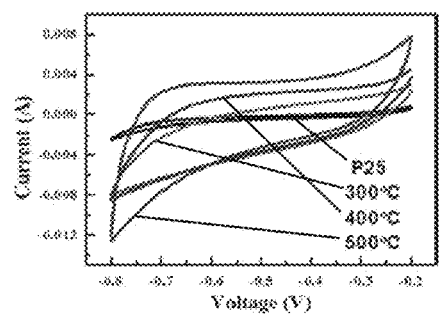
FIG. 5(a) shows a comparison of capacitance-voltage (CV) curves at a scan rate of 100 mV/s of an electrode prepared by coating a commercial titanium oxide powder (P25) without a treatment according to the method of the present invention on a Ni net, and supercapacitor electrodes prepared by coating black P25 powders on a Ni net, the black P25 powders being obtained by performing reduction treatments on the commercial titanium oxide powder (P25) using aluminum metal as the highly active metal at 300° C., 400° C., and 500° C., respectively, for 8 hours followed by a nitriding treatment at 600° C. for 4 hours under ammonia gas.

FIG. 5(a) shows a comparison of CV curves at a scan rate of 100 mV/s of an electrode prepared by coating a titanium oxide powder (P25) without a treatment according to the method of the present invention on a Ni net, and supercapacitor electrodes prepared by coating black P25 powders on a Ni net, the black P25 powders being obtained by performing reduction treatments on the titanium oxide powder (P25) using aluminum metal as the highly active metal at 300° C., 400° C., and 500° C. respectively for 8 hours followed by a nitriding treatment at 600° C. for 4 hours under ammonia gas, according to the first preparation method (a) of the present invention. It can be seen from FIG. 5(a) that the capacitance of the supercapacitor electrode prepared by coating a slurry containing the reduced power on a Ni net increases significantly, and increases gradually to 38 F/g (300° C.), 46 F/g (400° C.), and 52 F/g (500° C.) as the temperature rises in a range of 300~500° C. (The capacitance of the titanium oxide powder without a treatment according to the method of the present invention is 0.12 F/g).

Figure 5B:
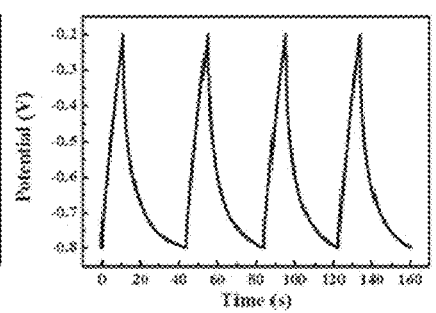
FIG. 5(b) shows a charge-discharge curve under a charge-discharge current of 1 A/g of a supercapacitor electrode prepared by coating a black P25 powder (P25-N) on a Ni net, the black P25 powder being obtained by performing a reduction treatment on the commercial titanium oxide powder (P25) using aluminum metal as the highly active metal at 500° C. for 8 hours followed by a nitriding treatment at 600° C. for 4 hours under ammonia gas, by means of the solution (a) of the present invention.

FIG. 5(b) shows a charge-discharge curve under a charge-discharge current of 1 A/g of a supercapacitor electrode prepared by coating a black P25 powder (P25-N) on a Ni net, the black P25 powder being obtained by a reduction treatment at 500° C. for 8 hours using aluminum metal as the highly active metal followed by a nitriding treatment at 600° C. for 4 hours under ammonia gas, according to the first preparation method (a) of the present invention. It can be calculated that the capacitance of the supercapacitor electrode prepared by coating a slurry containing the reduced power on a Ni net is 54 F/g.

Figure 6A:
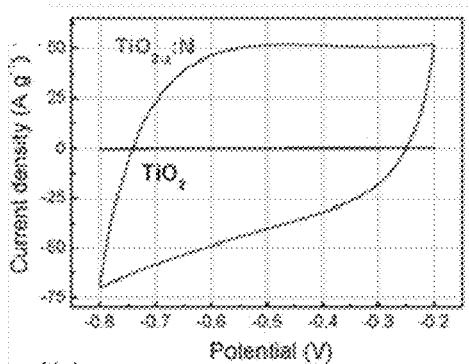
FIG. 6(a) shows a CV curve at a scan rate of 100 mV/s.

FIG. 6(a) shows a CV curve at a scan rate of 100 mV/s of a supercapacitor electrode prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas, according to the second preparation method (b) of the present invention. It can be seen from FIG. 6(a) that the capacitance of the supercapacitor electrode prepared by means of the second preparation method (b) of the present invention increases significantly, and is calculated at 571.6 F/g at a scan rate of 100 mV/s.

Figure 6B:
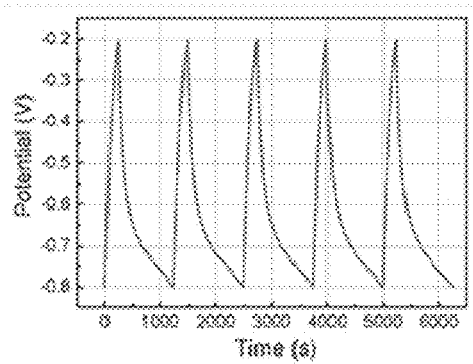
FIG. 6(b) shows a charge-discharge curve under a charge-discharge current of 1 A/g of a supercapacitor electrode prepared by applying an amorphous titanium dioxide powder on a Ni net, the amorphous titanium dioxide powder being obtained by a reduction treatment at 500° C. for 8 hours followed by a nitriding treatment at 600° C. for 4 hours under ammonia gas according to the methods of the present invention.

FIG. 6(b) shows a charge-discharge curve under a charge-discharge current of 1 A/g of a supercapacitor electrode prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas, according to the second preparation method (b) of the present invention. It can be calculated that the capacitance of the supercapacitor electrode prepared by means of the second preparation method (b) of the present invention under a charge-discharge current of 1 A/g is 1,670 F/g.

Figure 6C:
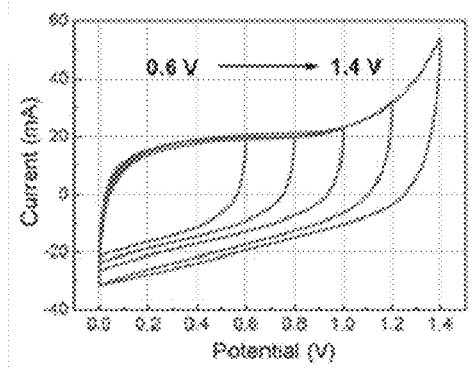
FIG. 6(c) shows a CV curve at a scan rate of 100 mV/s.

FIG. 6(c) shows a CV curve at a scan rate of 100 mV/s of a symmetric device composed of supercapacitor electrodes prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas, according to the second preparation method (b) of the present invention. It can be seen from FIG. 6(c) that the symmetric device composed of supercapacitor electrodes prepared by means of the second preparation method (b) of the present invention can stably extend the voltage window to 1.4 V at a scan rate of 100 mV/s.

Figure 6D:
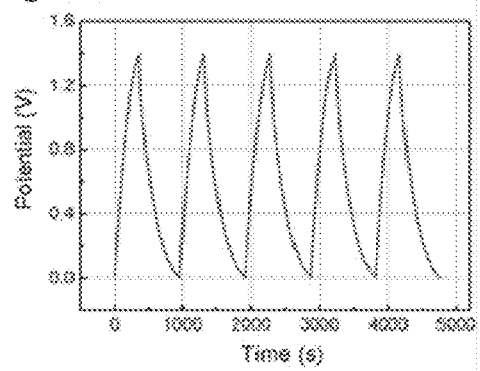
FIG. 6(d) shows a charge-discharge curve under a charge-discharge current of 1 A/g of a symmetric device composed of the supercapacitor electrodes.

FIG. 6(d) shows a charge-discharge curve under a charge-discharge current of 0.5 A/g of a symmetric device composed of supercapacitor electrodes prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas, according to the second preparation method (b) of the present invention. It can be calculated that the capacitance of the supercapacitor electrode prepared by means of the second preparation method (b) of the present invention is 410 F/g under a charge-discharge current of 0.5 A/g, and the device has an energy density of 111.80 Wh/Kg and a power density of 98 kW/Kg.

Figure 7:
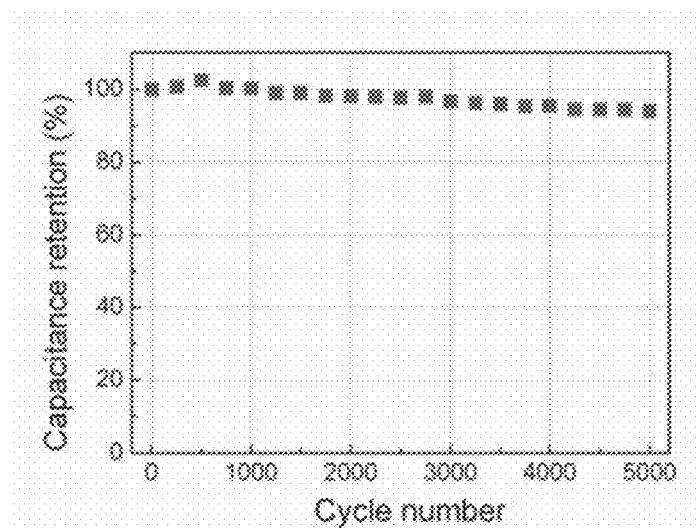
FIG. 7 shows a graph illustrating a change in the capacitance under a 5,000-cycle test of a supercapacitor electrode prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas according to the methods of the present invention.

FIG. 7 shows a graph illustrating a change in the capacitance under a 5,000-cycle test of a supercapacitor electrode prepared by submitting a Ni net coated with an amorphous titanium dioxide powder to a reduction treatment at 500° C. for 8 hours using aluminum metal as the highly active metal followed by a nitriding treatment at 600° C. for 4 hours under ammonia gas, according to the second preparation method (b) of the present invention. It can be seen from FIG. 7 that the supercapacitor electrode prepared by means of the second preparation method (b) of the present invention still retains 93% of the capacitance after 5,000 cycles.

Figure 8A:
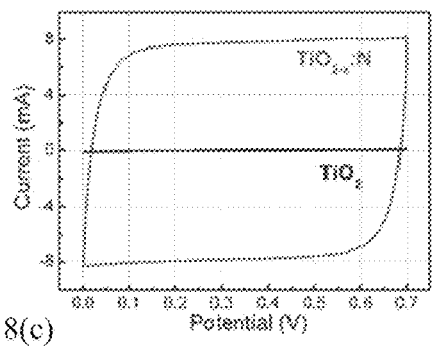
FIG. 8(a) shows a CV curve at a scan rate of 2 mV/s.

FIG. 8(a) shows a CV curve at a scan rate of 2 mV/s of a free-standing supercapacitor electrode prepared by a process that a black titanium dioxide powder is concocted to a slurry, then the slurry is dried and tableted, the black titanium dioxide powder being prepared by submitting an amorphous titanium dioxide powder to a reduction treatment at 500° C. for 8 hours using aluminum metal as the highly active metal followed by a nitriding treatment at 600° C. for 4 hours under ammonia gas, according to the first preparation method (a) of the present invention. It can be calculated that the free-standing supercapacitor electrode has a capacitance of 1800 F/g at a scan rate of 2 mV/s.

Figure 8B:
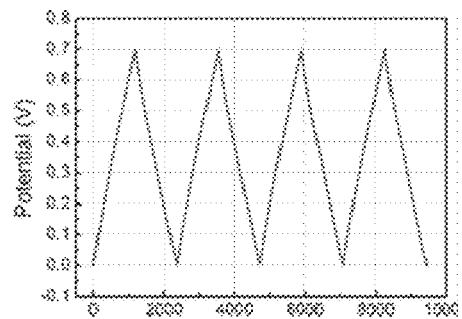
FIG. 8(b) shows a charge-discharge curve under a charge-discharge current of 1 A/g of a free-standing supercapacitor electrode prepared by performing tabletting on an amorphous titanium dioxide powder which is obtained by a reduction treatment at 500° C. for 8 hours followed by a nitriding treatment at 600° C. for 4 hours under ammonia gas.

FIG. 8(b) shows a charge-discharge curve under a charge-discharge current of 1 A/g of a free-standing supercapacitor electrode prepared by a process that a black titanium dioxide powder is concocted to a slurry, then the slurry is dried and tableted, the black titanium dioxide powder being prepared by submitting an amorphous titanium dioxide powder to a reduction treatment at 500° C. for 8 hours using aluminum metal as the highly active metal followed by a nitriding treatment at 600° C. for 4 hours under ammonia gas, according to the first preparation method (a) of the present invention. It can be calculated that the free-standing supercapacitor electrode has a capacitance of 1690 F/g under a charge-discharge current of 1 A/g.

Figure 8C:
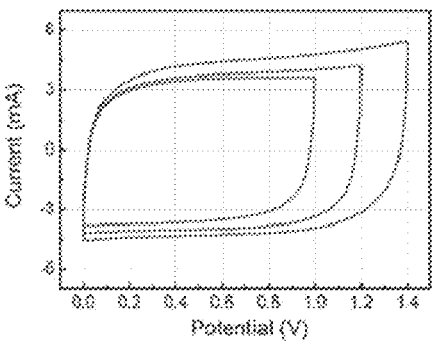
FIG. 8(c) shows a CV curve at a scan rate of 2 mV/s.

FIG. 8(c) shows a CV curve at a scan rate of 2 mV/s of a symmetric device composed of free-standing supercapacitor electrodes prepared by a process that a black titanium dioxide powder is concocted to a slurry, then the slurry is dried and tableted, the black titanium dioxide powder being prepared by submitting an amorphous titanium dioxide powder to a reduction treatment at 500° C. for 8 hours using aluminum metal as the highly active metal followed by a nitriding treatment at 600° C. for 4 hours under ammonia gas, according to the first preparation method (a) of the present invention. It can be seen from FIG. 8(c) that the symmetric device composed of supercapacitor electrodes prepared by means of the first preparation method (a) of the present invention can stably extend the voltage window to 1.4 V at a scan rate of 2 mV/s.

Figure 8D:
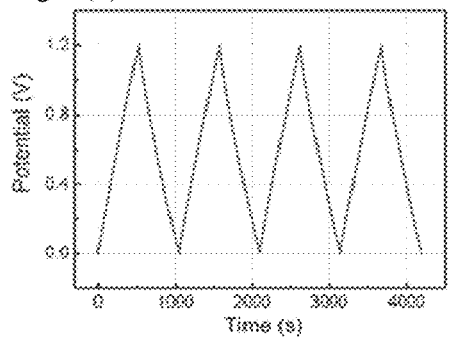
FIG. 8(d) shows a charge-discharge curve under a charge-discharge current of 1 A/g of a symmetric device composed of the free-standing supercapacitor electrode.

FIG. 8(d) shows that the symmetric device composed of free-standing supercapacitor electrodes prepared by a process that a black titanium dioxide powder is concocted to a slurry, then the slurry is dried and tableted, the black titanium dioxide powder being prepared by submitting an amorphous titanium dioxide powder to a reduction treatment at 500° C. for 8 hours using aluminum metal as the highly active metal followed by a nitriding treatment at 600° C. for 4 hours under ammonia gas, according to the first preparation method (a) of the present invention, has a capacitance of 1,740 F/g under a charge-discharge current of 1 A/g, an energy density of 87 Wh/Kg, and a power density of 32 kW/Kg.

Figure 9A:
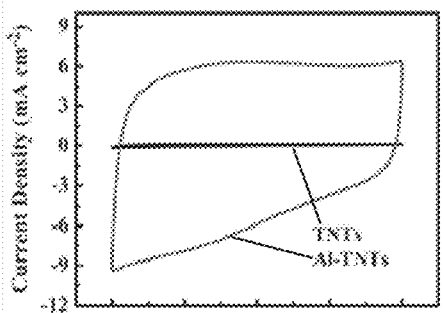
FIG. 9(a) shows a CV curve at a scan rate of 100 mV/s.

FIG. 9(a) shows a CV curve at a scan rate of 100 mV/s of a supercapacitor electrode prepared by anodizing a titanium sheet to give titanium dioxide nanotubes followed by a reduction treatment at 500° C. for 8 hours using aluminum metal as the highly active metal according to the second preparation method (b) of the present invention. It can be seen from FIG. 9(a) that the capacitance of the supercapacitor electrode prepared by means of the second preparation method (b) of the present invention increases significantly to 82 mF/cm² by calculating the CV curve at a scan rate of 5 mV/s.

Figure 9B:
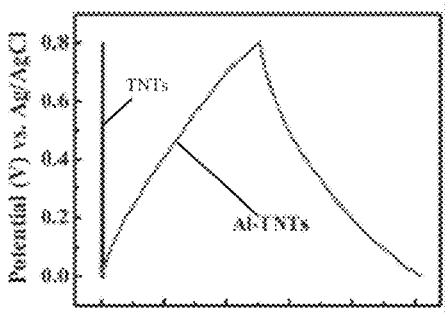
FIG. 9(b) shows a charge-discharge curve under a charge-discharge current density of 0.5 $mA/cm^2$.

FIG. 9(b) shows a charge-discharge curve under a charge-discharge current of 0.5 mA/cm² of a supercapacitor electrode prepared by anodizing a titanium sheet to give titanium dioxide nanotubes followed by a reduction treatment at 500° C. for 8 hours using aluminum metal as the highly active metal according to the second preparation method (b) of the present invention. It can be calculated that this supercapacitor electrode has a capacitance of 97 mF/cm² under a charge-discharge current of 0.5 mA/cm².

Figure 9C:
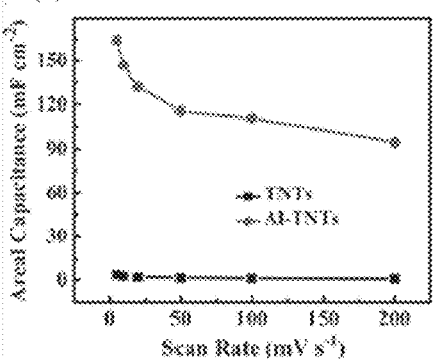
FIG. 9(c) shows areal capacitances obtained by calculating CV curves at various scan rates.

FIG. 9(c) shows capacitances at various scan rates in a range of 5 mV/s~200 mV/s of a supercapacitor electrode prepared by anodizing a titanium sheet to give titanium dioxide nanotubes followed by a reduction treatment at 500° C. for 8 hours using aluminum metal as the highly active metal according to the second preparation method (b) of the present invention. It can be seen from FIG. 9(c) that the capacitance of the supercapacitor electrode prepared by means of the second preparation method (b) of the present invention increases significantly at various scan rates.

Figure 9D:
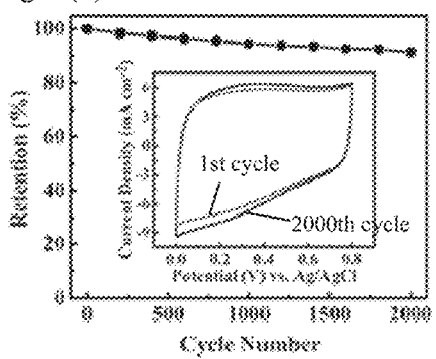
FIG. 9(d) shows a graph illustrating a change in the capacitance under a 2,000-cycle test of a supercapacitor electrode prepared by anodizing a titanium sheet to give titanium dioxide nanotubes followed by a reduction treatment at 500° C. for 8 hours according to the methods of the present invention.

FIG. 9(d) shows a graph illustrating a change in the capacitance under a 2,000-cycle test of a supercapacitor electrode prepared by anodizing a titanium sheet to give titanium dioxide nanotubes followed by a reduction treatment at 500° C. for 8 hours using aluminum metal as the highly active metal according to the second preparation method (b) of the present invention. It can be seen from FIG. 9(d) that the supercapacitor electrode prepared by means of the second preparation method (b) of the present invention still retains 92% of the capacitance after 2,000 cycles.

Hereinafter, the present invention will be better described with the following representative examples. It is should be understood that the following examples are only used to explain this invention and do not limit the scope of this invention, and any non-essential improvements and modifications made by a person skilled in the art based on this invention all fall into the protection scope of this invention. The specific parameters below such as temperature and time are only exemplary, and a person skilled in the art can choose proper values within an appropriate range according to the description of this article, and are not restricted to the specific values cited below.

Example 1

A commercial titanium oxide powder (P25) as the raw material, and an aluminum metal as the highly active reducing metal are placed in different heating sections in a sealed tube furnace, respectively, and the whole system is vacuumized to 0.1 Pa. Then the aluminum and the titanium oxide are heated to 800° C. and 300~500° C., respectively. After a reaction of 8 hours, the heating power is turned off, and the sample cools down. To 3 mL solution of polyvinylidene fluoride in N-methyl-2-pyrrolidone (20 mg/mL) is added 0.4 g of the reduced P25 powder. The mixture is stirred for 8 h to give a uniformly dispersed titanium dioxide slurry. The titanium dioxide slurry is uniformly coated on a nickel net by knife coating, then dried under vacuum at 100° C. for 8 h.

The picture of the reduced titanium dioxide ($TiO_{2-x}$) powder is shown in FIG. 1, and it can be seen therefrom that the powder turns black after reduction.

The density of charge carrier of the reduced titanium dioxide powder is $8.3*10^{20}$ $cm^{-3}$.

The TEM and SEM images of the nano titanium dioxide on the nickel net are shown in FIG. 3, and it can be seen therefrom that the titanium dioxide is uniformly coated on the nickel net, and amorphous layers with a thickness of 2~10 nm are formed at the surface of the reduced titanium dioxide.

As shown in FIG. 5(a), the capacitance of the supercapacitor electrode prepared by coating the reduced titanium dioxide powder on a Ni net increases significantly. The supercapacitor electrode prepared by coating the untreated titanium dioxide power on a Ni net almost has no capacitance from the comparison of CV curves, while there is an obvious closed area in the CV curves in the case of the treated powder, which indicates that the capacitance significantly increases, and increases gradually as the temperature rises.

The electrode coated with the reduced titanium dioxide powder is submitted to a constant current charge-discharge test, and the result is shown in FIG. 5(b). It can be calculated from the charge-discharge curve that the capacitance of the reduced and nitriding powder is 54 F/g under a charge-discharge current of 1 A/g.

Example 2

An amorphous titanium dioxide made by hydrolysis of titanium tetrachloride as the raw material, and an aluminum metal as the highly active reducing metal are uniformly mixed together and placed in a sealed tube furnace, and the whole system is vacuumized to 0.1 Pa. Then the sample is heated to 300~500° C. After a reaction for 8 hours, the heating power is turned off, and the sample cools down. Then, an ammonia gas is filled into the sealed system, and the titanium dioxide is heated to 600° C. to undergo a nitriding treatment for 4 h. The sample is taken out after cooling down. To 3 mL solution of polyvinylidene fluoride in N-methyl-2-pyrrolidone (20 mg/mL) is added 0.4 g of the reduced black powder. The mixture is stirred for 8 h to give a uniformly dispersed titanium dioxide slurry. The titanium dioxide slurry is uniformly coated on a nickel net by knife coating, then dried under vacuum at 100° C. for 8 h.

As shown in "TiO$_2$—N" of FIG. 1, the amorphous titanium dioxide powder turns black after reduction and nitriding. The density of charge carrier thereof is $8.7*10^{21}$ cm$^{-3}$.

Amorphous layers with a thickness of 2~15 nm are formed at the surface of the reduced and nitrided amorphous titanium dioxide powder.

A CV test shows that, as compared with electrode by coating the untreated amorphous powder on the nickel net, the supercapacitor electrode obtained by coating the reduced and nitrided amorphous titanium dioxide powder on the nickel net has a significantly increased capacitance, which is 197 F/g at a scan rate of 100 mV/s by calculating. A constant current charge-discharge test is performed on the supercapacitor electrode obtained by coating the reduced and nitrided amorphous titanium dioxide powder on the nickel net, and the calculation result shows that the capacitance of the reduced and nitrided powder is 273 F/g under a charge-discharge current of 1 A/g.

Example 3

An amorphous titanium dioxide made by hydrolysis of titanium tetrachloride (same as that in Example 2) as the raw material, and an aluminum metal as the highly active reducing metal are uniformly mixed together and placed in a sealed tube furnace, and the whole system is vacuumized to 0.1 Pa. Then the sample is heated to 500° C. After a reaction for 8 hours, the heating power is turned off, and the sample cools down. Then, a hydrogen sulfide gas is filled into the sealed system, and the titanium dioxide is heated to 600° C. to undergo a sulfuration treatment for 4 h. The sample is taken out after cooling down. To 1.5 mL solution of polyvinylidene fluoride in N-methyl-2-pyrrolidone (20 mg/mL) is added 0.4 g of the reduced and sulfurized amorphous powder. The mixture is stirred for 8 h to give a uniformly dispersed titanium dioxide slurry. The titanium dioxide slurry is uniformly coated on a nickel net by knife coating, then dried under vacuum at 100° C. for 8 h.

As shown in "TiO$_2$—S" of FIG. 1, the amorphous titanium dioxide powder turns yellow after reduction and sulfuration. The density of charge carrier thereof is $9.3*10^{18}$ cm$^{-3}$.

The capacitance of the supercapacitor electrode obtained by coating the reduced and sulfurized amorphous titanium dioxide powder on the nickel net significantly increases, which is 157 F/g, as calculated from the CV curves at a scan rate of 100 mV/s.

A constant current charge-discharge test is performed on the supercapacitor electrode obtained by coating the reduced and sulfurized amorphous titanium dioxide powder on the nickel net, and the calculation result shows that the capacitance of the electrode is 211 F/g under a charge-discharge current of 1 A/g.

Example 4

An amorphous titanium dioxide made by a titanium tetrachloride and nickel chloride co-precipitation method is used as the raw material, and an aluminum metal is used as the highly active reducing metal. The aluminum metal and the nickel-doped titanium dioxide are uniformly mixed together and placed in a sealed tube furnace, and the whole system is vacuumized to 0.1 Pa. Then the sample is heated to 500° C. After a reaction for 8 hours, the heating power is turned off, and the sample cools down. The sample is taken out after cooling down. To 1.5 mL solution of polyvinylidene fluoride in N-methyl-2-pyrrolidone (20 mg/mL) is added 0.4 g of the reduced nickel-doped titanium dioxide. The mixture is stirred for 8 h to give a uniformly dispersed titanium dioxide slurry. The titanium dioxide slurry is uniformly coated on a nickel net by knife coating, then dried under vacuum at 100° C. for 8 h.

The nickel-doped titanium dioxide powder made through co-precipitation is pale green, and turns deep dark green after reduction. The density of charge carrier of the nickel-doped reduced titanium dioxide is $9.3*10^{18}$ cm$^{-3}$.

The capacitance of supercapacitor electrode obtained by coating the reduced and nickel-doped titanium dioxide powder on the nickel net significantly increases, which is 271 F/g, as calculated from the CV curves at a scan rate of 100 mV/s.

A constant current charge-discharge test is performed on the supercapacitor electrode obtained by coating the reduced nickel-doped titanium dioxide powder on the nickel net, and the calculation result shows that the capacitance of the electrode is 326 F/g under a charge-discharge current of 1 A/g.

Example 5

An amorphous titanium dioxide made by hydrolysis of titanium tetrachloride (same as that in Example 2) is used as the raw material. To 1.5 mL solution of polyvinylidene fluoride in N-methyl-2-pyrrolidone (20 mg/mL) is added 0.4 g of the amorphous titanium dioxide powder. The mixture is stirred for 8 h to give a uniformly dispersed titanium dioxide slurry. The titanium dioxide slurry is uniformly coated on a nickel net by knife coating, then dried under vacuum at 100° C. for 8 h. An aluminum metal and the nickel net electrode coated with the amorphous titanium dioxide are uniformly mixed together and placed in a sealed tube furnace, and the whole system is vacuumized to 0.1 Pa. Then the sample is heated to 500° C. After a reaction for 8 hours, the heating power is turned off. Then, an ammonia gas is filled into the sealed system, and the nickel net electrode coated with the amorphous titanium dioxide is heated to 600° C. to be nitrided for 4 h. The electrode is taken out after cooling down. Two reduced and nitrided electrodes are assembled into a symmetric supercapacitor device, wherein the two pieces of the electrodes are separated by a diaphragm, and the electrolyte is a solution of tetraethyl ammonium tetrafluoroborate in acetonitrile.

The pictures of the nickel net electrodes coated with amorphous titanium dioxide before and after reduction and nitriding are shown in FIG. 4 at (a), which shows that the electrode is white before treatment, and turns dark after reduction and nitriding.

The capacitance of the nickel net electrode coated with amorphous titanium dioxide increases significantly after the reduction and nitriding treatment, and is much larger than that of the electrode prepared by the method of Example 2. As shown in FIG. 6(a), the calculated capacitance of the supercapacitor electrode is 571 F/g at a scan rate of 100 mV/s, the specific capacitance gradually increases as the scan rate decreases, and the capacitances of the supercapacitor electrode calculated from CV curves at various scan rates are 930 F/g (50 mV/s), 1130 F/g (10 mV/s), and 1380 F/g (2 mV/s), respectively.

The capacitance of the nickel net electrode coated with amorphous titanium dioxide increases significantly after the reduction and nitriding treatment, and is much larger than that of the electrode prepared by the method of Example 2. As shown in FIG. 6(b), the discharging time of the charge-discharge curve increases significantly as the charge-discharge current decreases, indicating that the capacitance gradually increases. It can be calculated from the charge-discharge curve under a charge-discharge current of 1 A/g that the capacitance of the supercapacitor electrode is 1,670 F/g.

The nickel net electrodes coated with amorphous titanium dioxide after reduction and nitriding are assembled into a symmetric device. As shown in FIG. 6(c), the symmetric device can stably extend the voltage window to 1.4 V at a scan rate of 100 mV/s.

The nickel net electrodes coated with amorphous titanium dioxide after reduction and nitriding are assembled into a symmetric device, which is submitted to a charge-discharge test under a current of 0.5 A/g. The test result is shown in FIG. 6(d). The calculation result shows that the symmetric device has a capacitance of 410 F/g, an energy density of 111.80 Wh/Kg, and a power density of 98 kW/Kg.

A 5,000-cycle CV test is performed on the nickel net electrode coated with amorphous titanium dioxide after reduction and nitriding. As shown in FIG. 7, the electrode retains 97.7% of the capacitance after 1,000 cycles, and 93% of the capacitance after 5,000 cycles.

Example 6

An amorphous titanium dioxide made by hydrolysis of titanium tetrachloride (same as that in Example 2) is used as the raw material. To 1.5 mL solution of polyvinylidene fluoride in N-methyl-2-pyrrolidone (20 mg/mL) is added 0.4 g of the amorphous titanium dioxide powder. The mixture is stirred for 8 h to give a uniformly dispersed titanium dioxide slurry. The titanium dioxide slurry is uniformly coated on a nickel net by knife coating, then dried under vacuum at 100° C. for 8 h. An aluminum metal and the nickel net electrode coated with the amorphous titanium dioxide are uniformly mixed together and placed in a sealed tube furnace, and the whole system is vacuumized to 0.1 Pa. Then the sample is heated to 500° C. After a reaction for 8 hours, the heating power is turned off. Then, a hydrogen sulfide gas is filled into the sealed system, and the nickel net electrode coated with the amorphous titanium dioxide is heated to 600° C. to be sulfurized for 4 h. The electrode cools down then is taken out.

The electrode turns deep yellow after reduction and sulfuration treatments.

The capacitance of the nickel net electrode coated with amorphous titanium dioxide after reduction and sulfuration significantly increases, which is 174 F/g, as calculated from the CV curve at a scan rate of 100 mV/s.

A constant current charge-discharge test is performed on the nickel net electrode coated with amorphous titanium dioxide after reduction and sulfuration, and the calculation result shows that the capacitance of the electrode is 259 F/g under a charge-discharge current of 1 A/g.

Example 7

An amorphous titanium dioxide made by hydrolysis of titanium tetrachloride (same as that in Example 2) is used as the raw material. To 1.5 mL solution of polyvinylidene fluoride in N-methyl-2-pyrrolidone (20 mg/mL) is added 0.4 g of the amorphous titanium dioxide powder. The mixture is stirred for 8 h to give a uniformly dispersed titanium dioxide slurry. The titanium dioxide slurry is uniformly coated on an FTO by knife coating, then dried under vacuum at 100° C. for 8 h. An aluminum metal and the FTO electrode coated with the amorphous titanium dioxide are uniformly mixed together and placed in a sealed tube furnace, and the whole system is vacuumized to 0.1 Pa. Then the sample is heated to 500° C. After a reaction for 8 hours, the heating power is turned off. Then, an ammonia gas is filled into the sealed system, and the FTO electrode coated with the amorphous titanium dioxide is heated to 600° C. to be nitrided for 4 h. The electrode cools down then is taken out.

The FTO electrode coated with amorphous titanium dioxide is white before treatment, and turns dark after reduction and nitriding.

The capacitance of the FTO electrode coated with amorphous titanium dioxide after reduction and nitriding significantly increases, which is 174 F/g, as calculated from the CV curve at a scan rate of 100 mV/s.

A constant current charge-discharge test is performed on the FTO electrode coated with amorphous titanium dioxide after reduction and nitriding, and the calculation result shows that the capacitance of the electrode is 470 F/g under a charge-discharge current of 1 A/g.

Example 8

An amorphous titanium dioxide made by hydrolysis of titanium tetrachloride (same as that in Example 2) is used as the raw material. To 1.5 mL solution of polyvinylidene fluoride in N-methyl-2-pyrrolidone (20 mg/mL) is added 0.4 g of the amorphous titanium dioxide powder. The mixture is stirred for 8 h to give a uniformly dispersed titanium dioxide slurry. The titanium dioxide slurry is uniformly coated on a nickel net by knife coating, then dried under vacuum at 100° C. for 8 h. The nickel net electrode coated with the amorphous titanium dioxide is placed in a sealed tube furnace. The whole system is vacuumized to 0.1 Pa, and filled with hydrogen gas. The sample is heated to 500° C. After a reaction for 8 hours, the heating power is turned off and the electrode is taken out. Then, an ammonia gas is filled into the sealed system, and the nickel net electrode coated with the amorphous titanium dioxide is heated to 600° C. to be nitrided for 4 h. The electrode is taken out after cooling down.

The electrode turns dark after hydrogen reduction and nitrogen doping.

The capacitance of the nickel net electrode coated with amorphous titanium dioxide after hydrogenation reduction and nitriding significantly increases to 376 F/g, as calculated from the CV curve at a scan rate of 100 mV/s.

A constant current charge-discharge test is performed on the nickel net electrode coated with amorphous titanium dioxide after reduction and sulfuration, and the calculation result shows that the capacitance of the electrode is 460 F/g under a charge-discharge current of 1 A/g.

Example 9

An amorphous titanium dioxide made by hydrolysis of titanium tetrachloride (same as that in Example 2) is used as the raw material, and an aluminum metal is used as the highly active reducing metal. The aluminum metal and the titanium dioxide are placed in different heating sections in a dual-temperature-zone furnace, respectively, and the whole system is vacuumized to 0.1 Pa. Then the electrode sheet is heated to 500° C. and the aluminum powder is heated to 850° C. After a reaction for 8 hours, the heating power is turned off, and the sample cools down. An ammonia gas is filled into the sealed system, and the titanium dioxide is heated to 600° C. to be nitrided for 4 h. The sample is taken out after cooling down. To 3 mL solution of polyvinylidene fluoride in N-methyl-2-pyrrolidone (20 mg/mL) is added 0.4 g of the reduced and nitrided black titanium dioxide powder, and 0.04 g of acetylene black. The mixture is stirred for 8 h to give a uniformly dispersed titanium dioxide slurry. The slurry is dried and milled to give a powder. The powder is tableted to give a free-standing titanium dioxide electrode.

As shown in FIG. 8(a), the calculated capacitance of the supercapacitor electrode calculated is 1,800 F/g at a scan rate of 2 mV/s.

As shown in FIG. 8(b), it is calculated from the charge-discharge curve under a charge-discharge current of 1 A/g that the capacitance of the supercapacitor electrode calculated is 1,690 F/g.

The free-standing electrodes are assembled into a symmetric device, which can stably extend the voltage window to 1.4 V at a scan rate of 2 mV/s as shown in FIG. 8(c).

The free-standing electrodes are assembled into a symmetric device, which is submitted to a charge-discharge test under a current of 0.5 A/g. The test result is shown in FIG. 8(d). The calculation result shows that the symmetric device has a capacitance of 1,740 F/g, an energy density of 87 Wh/Kg, and a power density of 32 kW/Kg [94% capacitance retention after 10,000 cycles].

Example 10

An amorphous titanium dioxide made by hydrolysis of titanium tetrachloride (same as that in Example 2) is used as the raw material. To 3 mL solution of polyvinylidene fluoride in N-methyl-2-pyrrolidone (20 mg/mL) is added 0.4 g of the amorphous titanium dioxide powder and 0.04 g of acetylene black. The mixture is stirred for 8 h to give a uniformly dispersed titanium dioxide slurry. The slurry is dried and milled to give a powder. The powder is tableted to give a free-standing amorphous titanium dioxide electrode sheet. An aluminum metal as the highly active reducing metal and the amorphous titanium dioxide electrode sheet are placed in different heating sections in a dual-temperature-zone furnace, respectively, and the whole system is vacuumized to 0.1 Pa. Then the electrode sheet is heated to 500° C. and the aluminum powder is heated to 850° C. After a reaction for 8 hours, the heating power is turned off, and the sample cools down. An ammonia gas is filled into the sealed system, and the electrode sheet is heated to 600° C. to be nitrided for 4 h. The sample is taken out after cooling down to give a free-standing reduced and nitrided titanium dioxide electrode.

The calculated capacitance of the supercapacitor electrode is 1,872 F/g at a scan rate of 2 mV/s.

It is calculated from the charge-discharge curve under a charge-discharge current of 1 A/g that the capacitance of the supercapacitor electrode calculated is 1,740 F/g [93% capacitance retention after 10,000 cycles].

Example 11

A titanium sheet is anodized to grow titanium nanotube arrays at the surface. Specifically, a copper is used as the cathode, a solution of glycol in water (volume ratio of ethylene glycol:water=97:3) containing 0.4 wt % $NH_4F$ is used as the electrolytic solution, and the titanium sheet is oxidized by application of a 100V DC power supply for 25 min, followed by application of an ultrasound to remove the nanotubes as formed, leaving bowl pits at the surface of the titanium sheet; then, the titanium sheet is oxidized by application of a 100V DC power supply for 25 min again, to give high-quality nanotubes. The resulting titanium sheet is dried and annealed at 500° C. for 8 h in an air atmosphere. Subsequently, the titanium sheet with titanium dioxide nanotubes grown therein as the raw material and an aluminum metal as the highly active reducing metal are placed in different heating sections in a dual-temperature-zone furnace, respectively, and the whole system is vacuumized to 0.1 Pa. Then the electrode sheet is heated to 500° C. and the aluminum powder is heated to 850° C. After a reaction for 8 hours, the heating power is turned off, and the sample is taken out after cooling down.

A CV test is conducted at a scan rate of 100 mV/s. As shown in FIG. 9(a), the capacitance of the supercapacitor electrode increases significantly to 82 $mF/cm^2$, as calculated from the CV curve at a scan rate of 5 mV/s.

The charge-discharge curve of the supercapacitor electrode under a charge-discharge current of 0.5 $mA/cm^2$ is shown in FIG. 9(b), from which it can be calculated that the capacitance of the supercapacitor electrode is 97 $mF/cm^2$ under a charge-discharge current of 0.5 $mA/cm^2$.

The capacitances of the supercapacitor electrode at various scan rates in a range of 5 mV/s~200 mV/s are shown in FIG. 9(c), from which it can be calculated that the capacitance of the supercapacitor electrode increases significantly at each scan rate.

A change in the capacitance of the supercapacitor electrode under a 2,000-cycle test is shown in FIG. 9(d), from which it can be seen that the electrode still retains 92% of the capacitance after 2,000 cycles.

Example 12

A titanium sheet electrode with titanium dioxide nanotubes grown therein as the raw material, and an aluminum metal as the highly active metal are placed in different heating sections in a dual-temperature-zone furnace, respectively, and the whole system is vacuumized to 0.1 Pa. Then the electrode sheet is heated to 500° C. and the aluminum powder is heated to 850° C. After a reaction for 8 hours, the heating power is turned off. After the sample cools down, an ammonia gas is filled into the sealed system, and the electrode sheet is heated to 600° C. to be nitrided for 4 h, then cools down and is taken out to give a reduced and nitrided electrode.

The capacitance of electrode is 185 $mF/cm^2$, as calculated from the CV curve at a scan rate of 5 mV/s.

The capacitance of electrode is 336 $mF/cm^2$, as calculated from the charge-discharge curve under a charge-discharge current of 0.5 $mA/cm^2$.

Example 13

A processing method which is the same as that of Example 2 is adopted, with a rutile titanium dioxide having a particle size of 1 micron being used as the raw material, to obtain a micron-sized nitrogen-doped titanium oxide, which has a capacitance of 103 F/g as calculated from the CV curve at a scan rate of 2 mV/s.

The capacitance of the electrode is 112 F/g, as calculated from the charge-discharge curve under a charge-discharge current of 1 A/g [96% capacitance retention after 10,000 cycles].

Example 14

A processing method which is the same as that of Example 2 is adopted, with an anatase titanium dioxide having a particle size of 2.3 micron being used as the raw material, to obtain a micron-sized nitrogen-doped titanium oxide, which has a capacitance of 55 F/g as calculated from the CV curve at a scan rate of 2 mV/s.

The capacitance of electrode is 58 F/g, as calculated from the charge-discharge curve under a charge-discharge current of 1 A/g [97% capacitance retention after 10,000 cycles].

The micron-sized nitrogen-doped titanium oxide is made into a symmetric device by means of a processing method which is the same as that of Example 9, which has a capacitance of 42 F/g [94% capacitance retention after 10,000 cycles].

Example 15

A conductive nitrogen-doped titanium oxide (same as that in Example 2) is used as a synergist, and $MnO_2$ active substances are added by an electrochemical deposition method, to obtain a nitrogen-doped titanium oxide/$MnO_2$ composite electrode, which has a capacitance of 624 F/g as calculated from the CV curve at a scan rate of 2 mV/s, and 90% capacitance retention after 10,000 cycles.

Comparative Example 1

$MnO_2$ active substances are prepared on a current collector by means of an electrochemical deposition method (same as that in Example 15), to give a pure $MnO_2$ electrode, which has a capacitance of 432 F/g as calculated from the CV curve at a scan rate of 2 mV/s, and 32% capacitance retention after 10,000 cycles.

Example 16

A conductive nitrogen-doped titanium oxide (same as that in Example 2) is used as a synergist, and NiO active substances are added by a mechanical ball milling method, to obtain a nitrogen-doped titanium oxide/NiO composite electrode, which has a capacitance of 927 F/g as calculated from the CV curve at a scan rate of 2 mV/s, and 87% capacitance retention after 10,000 cycles.

Comparative Example 2

NiO active substances (same as that in Example 2) are coated on a current collector to give a pure NiO electrode, which has a capacitance of 798 F/g as calculated from the CV curve at a scan rate of 2 mV/s, and 27% capacitance retention after 10,000 cycles.

Example 17

A conductive nitrogen-doped titanium oxide (same as that in Example 2) is used as a synergist, and polyaniline active substances are added by an electrochemical deposition method, to obtain a nitrogen-doped titanium oxide/polyaniline composite electrode, which has a capacitance of 1,200 F/g as calculated from the CV curve at a scan rate of 2 mV/s, and 92% capacitance retention after 10,000 cycles.

Comparative Example 3

Polyaniline active substances are prepared on a current collector by means of an electrochemical deposition method (same as that in Example 17), to give a pure polyaniline electrode, which has a capacitance of 967 F/g as calculated from the CV curve at a scan rate of 2 mV/s, and 17% capacitance retention after 10,000 cycles.

Example 18

A conductive nitrogen-doped titanium oxide (same as that in Example 2) is used as a synergist, and activated carbon is added as the active substance by a mechanical ball milling method, to obtain a nitrogen-doped titanium oxide/activated carbon composite electrode, which has a capacitance of 312 F/g as calculated from the CV curve at a scan rate of 2 mV/s, and 98% capacitance retention after 10,000 cycles.

Comparative Example 4

Activated carbon active substances (same as that in Example 18) are coated on a current collector to give a pure activated carbon electrode, which has a capacitance of 180 F/g as calculated from the CV curve at a scan rate of 2 mV/s, and 97% capacitance retention after 10,000 cycles.

INDUSTRIAL APPLICABILITY

The present invention provides a supercapacitor electrode material with conductive titanium oxide as the active substance, and relates to a method which requires little equipment, has a short preparation period, is low in cost, and is capable of preparing a capacitor with good performance. As compared with conventional capacitors, the supercapacitor prepared herein has advantages of high energy density, high power density, and good cycle stability, and has broad prospective applications in areas of electric vehicles, energy storage, etc.

The invention claimed is:

1. A titanium oxide-based supercapacitor electrode material, comprising a conductive titanium oxide as an active substance, wherein the conductive titanium oxide is selected from the group consisting of titanium sub-oxide, reduced titanium dioxide, and doped reduced titanium dioxide, a whole or a surface of the titanium sub-oxide, the reduced titanium dioxide, or the doped reduced titanium dioxide having amorphous layers comprising defect structures and activated $Ti^{3+}$; and the titanium oxide-based supercapacitor electrode material has a density of charge carrier higher than $10^{18}$ $cm^{-3}$, and a specific capacitance in a range of 20 F/g~1,740 F/g, under a charge-discharge current of 1 A/g; and the titanium sub-oxide, the reduced titanium dioxide, or the doped reduced titanium dioxide is prepared by a step of performing a high surface reduction treatment on titanium dioxide to obtain the titanium sub-oxide or the reduced titanium dioxide, or by a step of performing the high surface reduction treatment and a doping treatment on titanium dioxide to obtain the doped reduced titanium dioxide; wherein the high surface reduction treatment is performed at 200~500° C. for 2~12 hours.

2. The titanium oxide-based supercapacitor electrode material according to claim 1, characterized in that the specific capacitance of the titanium oxide-based supercapacitor electrode material is in a range of 20 F/g~1,872 F/g at a charge-discharge rate of 2 mV/s, 15 F/g~1,130 F/g at a charge-discharge rate of 10 mV/s, 10 F/g~930 F/g at a charge-discharge rate of 50 mV/s, and 10 F/g~571 F/g at a charge-discharge rate of 100 mV/s, respectively, and has an attenuation of less than 5% after 1,000 cycles, less than 8% after 5,000 cycles, and less than 10% after 10,000 cycles, respectively.

3. The titanium oxide-based supercapacitor electrode material according to claim 1, characterized in that the titanium oxide-based supercapacitor electrode material can serve as a positive electrode active material, a negative electrode active material, or a synergic material in a supercapacitor, and the titanium oxide-based supercapacitor electrode material can be used to construct a symmetric supercapacitor with both of a positive electrode and a negative electrode comprising the titanium oxide-based supercapacitor electrode material.

4. The titanium oxide-based supercapacitor electrode material according to claim 1, characterized in that a doping element of the doped reduced titanium dioxide is a metal element and/or a non-metal element, the metal element is one or more elements selected from the group consisting of vanadium, chromium, manganese, iron, cobalt, nickel, copper, niobium, molybdenum, tantalum, ruthenium, silver, platinum, tungsten, cadmium, and rhodium, and the non-metal element is one or more elements selected from the group consisting of hydrogen, nitrogen, carbon, boron, sulfur, selenium, phosphorus, fluorine, chlorine, bromine, and iodine.

5. The titanium oxide-based supercapacitor electrode material according to claim 4, characterized in that a thickness of the amorphous layer is 0.5 nm or more.

6. The titanium oxide-based supercapacitor electrode material according to claim 4, characterized in that the defect structure includes oxygen vacancies, interstitial titanium, and/or direct bonding between titanium and titanium.

7. The titanium oxide-based supercapacitor electrode material according to claim 1, characterized in that an apparent color of the titanium sub-oxide, the reduced titanium dioxide, or the doped reduced titanium dioxide ranges from yellow to green to brown to blue to gray to black depending on a conductivity.

8. A titanium oxide-based supercapacitor electrode comprising the titanium oxide-based supercapacitor electrode material according to claim 1, characterized in that the titanium oxide-based supercapacitor electrode comprises a conductive substrate, and the titanium sub-oxide, the reduced titanium dioxide or the doped reduced titanium dioxide supported on the conductive substrate, and the conductive substrate includes a metal substrate, a carbon material substrate, and a conductive glass selected from the group consisting of FTO, ITO, AZO, ZnO:B, ZnO:Ga, ZnO:In, $Cd_2SnO_4$, $Zn_2SnO_4$, $TiO_2$:Nb, $SrTiO_3$:Nb, CuS, $CuAlO_2$ and $CuAlS_2$.

9. A titanium oxide-based supercapacitor electrode comprising the titanium oxide-based supercapacitor electrode material according to claim 1, characterized in that the titanium oxide-based supercapacitor electrode is a free-standing titanium oxide-based supercapacitor electrode formed by the titanium sub-oxide, the reduced titanium dioxide, or the doped reduced titanium dioxide.

10. A method for preparing a titanium oxide-based supercapacitor electrode comprising the titanium oxide-based supercapacitor electrode material according to claim 1, comprising:
    mixing the titanium sub-oxide, the reduced titanium dioxide, or the doped reduced titanium dioxide with a solvent and an aid to obtain a slurry; and
    a coating method of coating the slurry on a conductive substrate followed by drying to obtain a conductive substrate-supporting titanium oxide-based supercapacitor electrode, or drying the slurry followed by milling and tabletting to obtain a free-standing titanium oxide-based supercapacitor electrode.

11. The method according to claim 10, characterized in that the aid includes a binder, and a conductive agent.

12. The method according to claim 11, characterized in that the conductive agent is one or more agents selected from the group consisting of acetylene black, carbon black, artificial graphite, natural graphite, flake graphite, vapor grown carbon fibers, carbon nanotubes, metal powders, and metal fibers.

13. The method according to claim 11, characterized in that the binder is one or more agents selected from the group consisting of polytetrafluoroethylene, polyvinylidene fluoride, polyethylene, polypropylene, polyacrylamide, ethylene-propylene-diene copolymer resin, styrene-butadiene rubber, polybutadiene, fluorine rubber, polyethylene oxide, polyvinyl pyrrolidone, polyester resins, acrylic resins, phenolic resins, epoxy resins, polyvinyl alcohol, and hydroxypropyl cellulose.

14. The method according to claim 11, characterized in that, in the slurry, a concentration of the titanium sub-oxide, the reduced titanium dioxide, or the doped reduced titanium dioxide is 0.001~1 g/mL, a concentration of the binder is 1~50 mg/mL, and a mass ratio of the conductive agent to the reduced titanium dioxide or the doped reduced titanium dioxide is (0.05~10):1.

15. The method according to claim 10, characterized in that the step of performing the high surface reduction treatment on the titanium dioxide to obtain the titanium sub-oxide or the reduced titanium dioxide comprises performing the high surface reduction treatment on titanium dioxide using a highly active metal or under a reducing atmosphere to obtain the titanium sub-oxide or the reduced titanium dioxide;
    the step of performing the high surface reduction treatment and the doping treatment on titanium dioxide to obtain the doped reduced titanium dioxide comprises: performing the high surface reduction treatment on titanium dioxide using a highly active metal or under a reducing atmosphere followed by performing a metal and/or non-metal doping treatment; or performing the metal and/or non-metal doping treatment on titanium dioxide followed by performing the high surface reduction treatment on the doped titanium dioxide using a highly active metal or under a reducing atmosphere, to obtain the doped reduced titanium dioxide.

16. The method according to claim 10, characterized in that the solvent is one or more solvents selected from the group consisting of water, alcohols, polyols, terpenes, N-methyl-2-pyrrolidone, dimethyl carbonate, diethyl carbonate, ethyl acetate, and methyl propionate.

17. The method according to claim 10, characterized in that the coating method is one or more methods selected from the group consisting of dip-coating, knife coating, spin coating, spray coating, screen printing, and suspended particles dip coating.

18. The method according to claim 10, characterized in that the titanium dioxide has one or more phases selected from the group consisting of amorphous phase, anatase phase, rutile phase, and brookite phase; and the titanium dioxide has one or more morphologies selected from the group consisting of ball, rod, strip, tube and irregular polygons.

19. A method for preparing a titanium oxide-based supercapacitor electrode comprising the titanium oxide-based supercapacitor electrode material according to claim 1, comprising:
    applying titanium dioxide on a conductive substrate followed by drying to obtain a conductive substrate-supporting titanium dioxide electrode, or drying a slurry containing titanium dioxide followed by milling and tabletting to obtain a free-standing titanium oxide electrode; and
    performing the high surface reduction treatment or the high surface reduction treatment and the doping treatment on the conductive substrate-supporting titanium dioxide electrode or the free-standing titanium oxide electrode to obtain the supercapacitor electrode.

20. The method according to claim 19, characterized in that the high surface reduction treatment or the high surface reduction treatment and doping treatment is:
    performing the high surface reduction treatment on the conductive substrate-supporting titanium dioxide electrode or the free-standing titanium oxide electrode using a highly active metal or under a reducing atmosphere;
    performing the high surface reduction treatment on the conductive substrate-supporting titanium dioxide electrode or the free-standing titanium oxide electrode using a highly active metal or under a reducing atmosphere followed by performing a metal and/or non-metal doping treatment; or
    performing the metal and/or non-metal doping treatment on the conductive substrate-supporting titanium dioxide electrode or the free-standing titanium oxide electrode followed by performing the high surface reduction treatment using a highly active metal or under a reducing atmosphere.

21. The method according to claim 20, characterized in that the doping treatment is performed at 200~1,000° C. for 2~12 hours.

22. The method according to claim 19, characterized in that the method for applying is one or more methods selected from the group consisting of dip-coating, knife coating, spin coating, spray coating, screen printing method, suspended particles dip coating, anodic electrodeposition, cathodic electrodeposition, electrophoresis, spray pyrolysis, chemical vapor deposition, and physical vapor deposition.

* * * * *